United States Patent [19]
Sato

[11] 3,939,763
[45] Feb. 24, 1976

[54] CONTINUOUS PRESS
[75] Inventor: Hachiro Sato, Tokyo, Japan
[73] Assignee: Fukoku Kogyo Company Limited, Tokyo, Japan
[22] Filed: Sept. 20, 1974
[21] Appl. No.: 508,012

[30] Foreign Application Priority Data
June 13, 1974 Japan................ 49-67351

[52] U.S. Cl. ............................ 100/93 S; 100/117
[51] Int. Cl.² ........................................ B30B 9/14
[58] Field of Search ................ 100/117, 145–150, 100/93 S; 425/378, 144; 99/443 C, 348

[56] References Cited
UNITED STATES PATENTS
| | | | |
|---|---|---|---|
| 2,678,600 | 5/1954 | Allen, Jr. ............................ | 100/93 S |
| 2,701,518 | 2/1955 | McDonald .......................... | 100/93 S |
| 2,722,716 | 11/1955 | Henning .............................. | 425/144 |
| 2,834,054 | 5/1958 | Maddock et al. ................. | 425/113 X |
| 3,276,353 | 10/1966 | Burner et al. ..................... | 100/38 X |

FOREIGN PATENTS OR APPLICATIONS
3,049   12/1900   Austria ............................. 100/93 S Primary Examiner—Peter Feldman
Attorney, Agent, or Firm—Lawrence I. Field

[57] ABSTRACT

A continuous press of a screw press type for pressing water, oils and fats out of sludges of paper pulp, fish scraps, etc. comprises a rotatable screw shaft, a screw drum secured to said screw shaft, a screw blade spirally arranged on the outer surface of said screw drum, an outer drum having a number of filtering small holes, an inlet for introducing raw materials to be pressed into a space between the screw drum and outer drum and an outlet for discharging pressed materials. The continuous press further comprises means for heating the screw drum and blade from the inside of the screw drum through said screw shaft.

3 Claims, 3 Drawing Figures

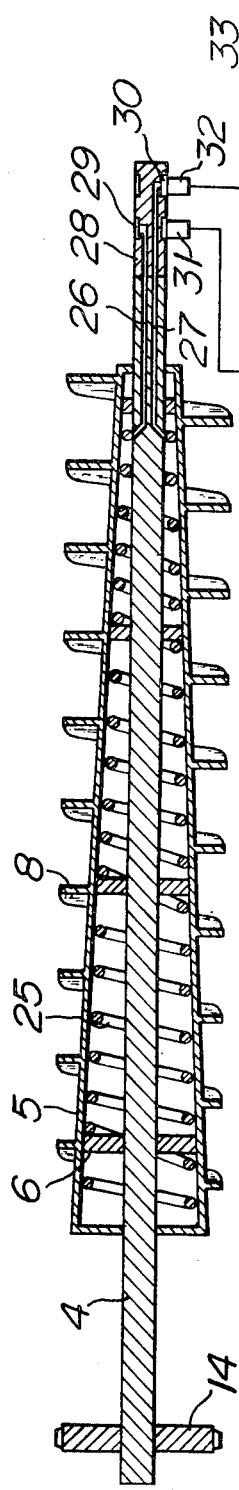
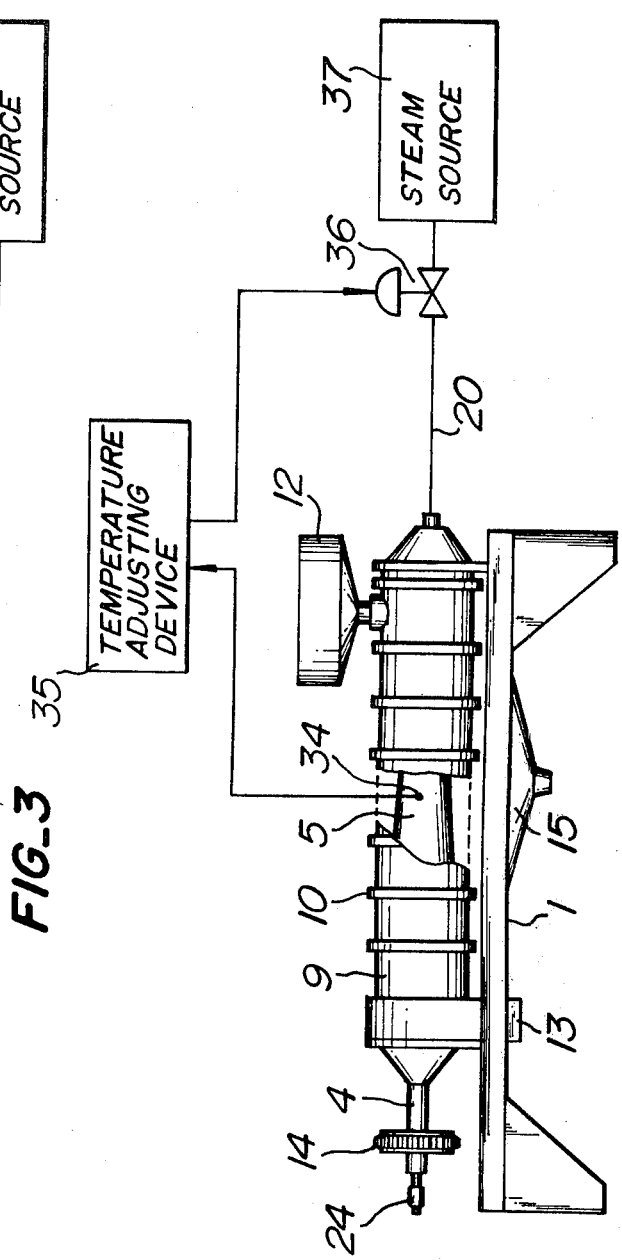

CONTINUOUS PRESS

BACKGROUND OF THE INVENTION

The present invention relates to a continuous press of a screw press type comprising a screw shaft arranged rotatably, a screw drum arranged around said screw shaft to rotate therewith, a screw blade arranged helically around the outer surface of said screw drum, an outer drum arranged around said screw blade and having a number of small filtering holes, an inlet provided at one end of said outer drum and an outlet provided at the other end of said outer drum, whereby raw materials to be pressed are introduced through said inlet into a space between said screw drum and outer drum, said space being gradually made small in a direction from said inlet to said outlet.

Such a continuous press has been widely used for continuously pressing water, oils and fats out of raw materials such as paper pulp, bony parts and guts of fishes, etc. However the filtering efficiency of the known continuous press is limited to a certain range and such a low efficiency could not be improved except by designing the press in a suitable manner. For example, water in paper making sludge can be pressed only to such an extent that a cake at a press outlet contains water by an amount of 60–70 percentages by weight and in case of bony parts and guts of fishes a cake still contains water by an amount of about 60 percentages by weight. This is an obstacle to succeeding steps. Moreover, oils and fats contained in bony parts and guts of fishes could hardly be filtered away merely by pressing them with known presses. Further an electric motor for rotating the screw shaft and screw drum is liable to be overloaded, because raw materials stick to the surfaces of the screw drum and screw blade.

The present invention has for its object to provide a continuous press or filter in which a high filtering efficiency can be attained and a load for the electric motor for rotating the screw shaft can be materially decreased.

It is another object of the invention to provide a continuous press which can press even oils and fats contained in materials such as bony parts and guts of fishes.

SUMMARY OF THE INVENTION

A continuous press of a screw press type according to the invention comprises a screw shaft arranged rotatably, a screw drum arranged around said screw shaft to rotate therewith, a screw blade arranged helically around the outer surface of said screw drum, an outer drum arranged around said screw blade and having a number of small filtering holes, an inlet provided at one end of said outer drum, an outlet provided at the other end of said outer drum and means for heating said screw drum and screw blade through said screw shaft, whereby raw materials to be pressed are introduced through said inlet into a space between said screw drum and outer drum, said space being gradually made smaller in a direction from said inlet to said outlet.

BRIEF DESCRIPTION OF THE DRAWINGS

Now the present invention will be explained more in detail with reference to the accompanying drawings, in which:

FIG. 2 is a cross section showing a screw shaft and a screw drum of another embodiment of the screw press according to the invention; and FIG. 3 is a schematic view for explaining a manner of effecting a temperature control in the screw press shown in FIG. 1.

DESCRIPTION OF THE PREFERRED EMBODIMENT

Figure 1:
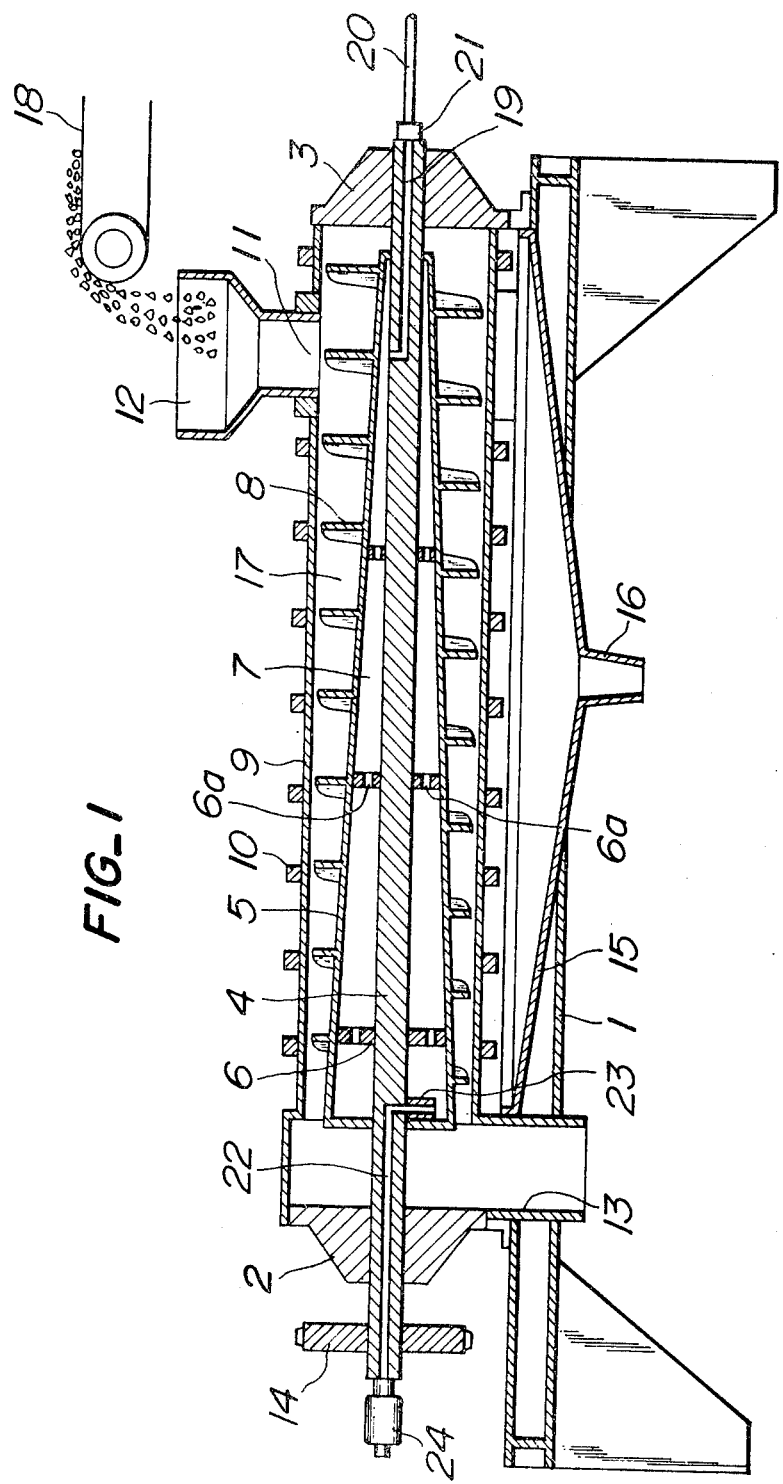
FIG. 1 is a cross section of an embodiment of the screw press according to the invention.

FIG. 1 shows a first embodiment of the screw press according to the invention. This screw press comprises a base 1 to which a pair of bearings 2 and 3 are secured. These bearings support a screw shaft 4 in a rotatable manner. A screw drum 5 is arranged around the screw shaft 4 through supporting rings 6 in such a manner that the screw drum 5 rotates together with the screw shaft 4. In the present embodiment a space 7 formed by the shaft 4 and the drum 5 must be hermetically sealed. On the outer surface of the screw drum 5 is secured a helical screw blade 8 of a suitable metal. Around the screw blade 8 is arranged an outer drum 9 having a number of small filtering holes (not shown). Both ends of the outer drum 9 are secured to the bearings 2 and 3. On the outer surface of the outer drum 9 are arranged guard rings 10. At one end of the outer drum 9 an inlet 11 is provided and a hopper 12 is connected to this inlet 11. At the other end of the outer drum 9 there is provided an outlet 13 which communicates with a space 17 formed by the screw drum 5 and the outer drum 9. In order to rotate the screw shaft 4 together with the screw drum 5 and the screw blade 8 one end of the screw shaft 4 is extended through the bearing 2 and a gear wheel 14 is connected to this extended end. The gear wheel 14 is coupled to an electric motor through an endless chain and a speed reduction mechanism, so that the shaft 4 is continuously rotated at a given speed. Below the outer drum 9 is arranged a plate 15 for receiving liquid pressed out of raw materials through the filtering holes formed in the outer drum 9. The plate 15 has an inclined surface so that liquid flows naturally towards its center at which a discharge pipe 16 is provided.

As shown in FIG. 1 the screw drum 5 is tapered in such a manner that its diameter increases gradually towards the outlet 13. While a radical length of the helical screw blade 8 is decreased towards the outlet 13 in such a manner that a diameter of a periphery of the blade 8 is made constant. Thus the space 17 formed by the screw drum 5, the screw blade 8 and the outer drum 9 is gradually decreased in the direction from the inlet 11 to the outlet 13.

Raw materials to be pressed are conveyed above the hopper 12 by means of a belt conveyer 18 and are introduced into the space 17 through the hopper 12 and the inlet 11. The raw materials thus introduced are transported towards the outlet 13 by means of the rotating screw blade 8 and during this transportation the raw materials are pressed to a gradually increased extent.

According to the present embodiment in order to heat the screw drum 5 and the screw blade 8, and thus the raw materials, at one end of the shaft 4 is formed a steam supplying conduit 19 one open end of which is communicated with the space 7 and the other open end is connected to a steam pipe 20 through a rotary coupling 21. The other end of the steam pipe 20 may be connected to a suitable steam source (not shown). At the other end of the shaft 4 there is formed a steam exhausting conduit 22 one open end of which is communicated with the space 7 through an exhaust tube 23. The other open end of the exhaust conduit 22 is connected to a steam trap 24. Further the supporting rings 6 are provided with holes 6a through which steam can pass.

When steam is supplied from the steam source to the space 7 inside the screw drum 5 through the steam pipe 20, the rotary coupler 21 and the conduit 19, the drum 5 is heated and the screw blade 8 is also heated by the thermal conduction. Thus the raw materials introduced in the space 17 are heated as well as pressed. When the materials are heated, the viscosity of liquid contained in the materials is decreased and is easy to be filtered away. Therefore the filtering efficiency is substantially increased. Moreover when bony parts and guts of fishes are heated, oils and fats contained therein are melted away and are easy to be filtered away together with water. At the same time water at the boundaries between the materials and the surfaces of the screw drum 5 and screw blade 8 is boiled and thus the materials are separated from these surfaces. As the result thereof the materials are transported smoothly from the inlet 11 to the outlet 13, so that the filtering efficiency is further improved and the load on the electric motor for rotating the shaft 4 is decreased. Cooled vapour is exhausted by the steam trap 24 through the exhaust tube 23 and conduit 22.

According to this embodiment the following results could be obtained with the raw materials a temperature of which at the inlet 11 was lower than the room temperature and the heating temperature was so adjusted that a temperature of cakes at the outlet 13 was about 60°–70°C.

TABLE

| | | Contained water (% by weight) | | Oils and fats (% by weight on dry base) | |
|---|---|---|---|---|---|
| | | Raw materials | Cakes | Raw materials | Cakes |
| Sludge in paper pump | | 79.5 | 45.5 | | |
| Scraps of fishes | Mackerel scum (1) | 91.4 | 42.5 | 40.8 | 22.0 |
| | Mackerel scum (2) | 82.0 | 33.3 | 47.2 | 13.3 |
| | Heads and bones of pollack | 78.8 | 43.6 | 11.3 | 3.8 |
| | Scraps of flat fish | 67.8 | 52.6 | 65.0 | 9.9 |

The screw press according to the invention can press water out of any kind of sludges of paper pulp some of which could not be treated by the known screw press. Further the screw press of this invention can also press muds of drainage.

FIG. 2 illustrates another embodiment of the screw press according to the invention. In this embodiment the screw drum 5 and screw blade 8 are heated by means of electricity instead of steam. To this end a Nichrome wire 25 is wound helically on the inner surface of the screw drum 5. Both ends 26 and 27 of the nichrome wire 25 are extended outwardly through the inside of the screw shaft 4. To the end of the screw shaft 4 is secured an electrically insulating rod 28 on which a pair of slip rings 29 and 30 are arranged. Said both ends 26 and 27 of the Nichrome wire 25 are connected to said slip rings 29 and 30, respectively. These slip rings may be connected to a suitable electric power source 33 through a pair of brushes 31 and 32 which make contact with the slip rings 29 and 30, respectively.

When the nichrome wire 25 is energized by the electric power source 33 through the brushes 31, 32 and the slip rings 29, 30, the screw drum 5 and the screw blade 8 are heated and thus the same result as the first embodiment shown in FIG. 1 can be obtained. In the second embodiment when the nichrome wire 25 is arranged along the screw blade 8, the screw blade 8 may be heated in the most suitable manner by the thermal conduction.

It should be noted that the present invention is not limited to the embodiments which have been explained hereinbefore and many modifications may be possible within the scope of the invention. For example, the screw drum 5 and screw blade 8 may be heated with the aid of hot blast. In this case hot blast may be introduced into the space 7 in the similar manner as the first embodiment of FIG. 1. But in this case the steam trap 24 may be deleted and it is sufficient to provide only an exhaust hole in the screw drum 5 at the side of the outlet 13. In the present invention the heat source is not limited to those explained above, but any kind of heat sources which are economical and easy to handle can be used.

Moreover in the above embodiments the space 17 between the screw drum 5 and the outer drum 9 is decreased towards the outlet 13 by tapering the screw drum 5. This may be also effected by tapering the outer drum 9 or by decreasing the pitch of the screw blade 8 towards the outlet 13.

According to the invention the screw drum and screw blade cannot be so heated that raw materials stick to their surfaces. In order to obtain the stable filtering action it is preferable to effect a heat control so as to maintain the temperature of the screw drum and thus raw materials constant.

FIG. 3 shows a manner of effecting the temperature control in the embodiment of FIG. 1. For this purpose a temperature detecting end 34 is provided at a suitable position of the screw drum 5 and an output of this temperature detecting end 34 is connected through the screw shaft 4 to a temperature adjusting device 35. In the temperature adjusting device 35 the detected temperature from the detecting end 34 is compared with a predetermined temperature to produce an error signal in accordance with a difference between said temperatures. Said error signal is supplied to a flow rate control valve 36 which is provided in the steam pipe 20 extending to the steam source 37 and the flow rate of steam is so controlled that the temperature of the screw drum 5 is always kept constant. As the temperature detecting end 34 use may be made of a thermo-couple, a thermal resistor, a thermistor, etc. The above temperature control system may be equally applied to the case in which hot blast is used for heating. Moreover, in case of using electricity for heating as illustrated in FIG. 2 electrical control element such as a thyristor connected in the circuit between the brushes 31, 32 and electric power source 33 may be controlled by the output signal from the temperature adjusting device 35.

As described above according to the continuous press of the invention it is possible to attain extremely efficient filtering action which could be never reached by known presses. Therefore a succeeding drying step which has been required in the prior art owing to the low filtering efficiency becomes superfluous. The screw press of the invention can also be made small in size and can avoid a smell pollution due to a forced drying. Further the load on the electric motor for rotating the screw shaft is decreased, so that the electric motor whose power is only about a half as compared with the known press is sufficient. In the known press since oils and fats of fish scraps could not be almost filtered out, fish cakes are used only as manure for planting, but the screw press according to the invention can press oils and fats out of fish scraps to some extent and thus fish cakes may be used as feeds for domestic animals and fish culture. In the prior art in order to increase the filtering efficiency raw materials have to be boiled prior to pressing, but according to the invention such a preparatory step is not necessary.

What is claim is:

1. A continuous press comprising: a substantially solid screw shaft, a screw drum disposed around said screw shaft to rotate therewith, a screw blade disposed helically around the outer surface of said screw drum, an outer drum arranged around said screw blade and having a number of small filtering holes, an inlet provided at one end of said outer drum, an outlet provided at the other end of said outer drum, means for heating said screw drum and screw blade through said screw shaft, said means for heating comprising: a supply conduit formed by a first bore in said screw shaft at one end thereof for introducing a heated fluid from said supply means into a space between said screw shaft and said screw drum and an exhausting conduit formed by a second bore in said screw shaft at the other end thereof for exhausting said fluid from said space to the outside, whereby raw materials to be pressed are introduced through said inlet into said space between said screw drum and outer drum, said space being gradually made smaller in a direction from said inlet to said outlet, and said press including in addition at least one supporting ring for reinforcing the coupling between said screw shaft and said screw drum, said supporting ring being provided with at least one passage through which said heated fluid passes.

2. A continuous press comprising a rotatable screw shaft, a screw drum arranged around said screw shaft to rotate therewith, a screw blade arranged helically around the outer surface of said screw drum, an outer drum arranged around said screw blade and having a number of small filtering holes, an inlet provided at one end of said outer drum, an outlet provided at the other end of said outer drum, and means for heating said screw drum and screw blade through said screw shaft, said heating means comprising: and electrical heating wire arranged in the space between said screw shaft and screw drum and being helically wound on the inner surface of said screw drum and being connectable to an external electric power source through one end of said screw shaft.

3. A continuous press as claimed in claim 2, including in addition at least one supporting ring for reinforcing said screw drum, said supporting ring being provided with at least one passage through which said electrically heating wire extends.

* * * * *